Patented Mar. 15, 1949

2,464,197

UNITED STATES PATENT OFFICE 2,464,197

BACTERIOSTATIC AND ANTIBIOTIC COMPOUND AND METHOD OF PREVENTING BACTERIAL GROWTHS

Hans T. Clarke, New York, N. Y., assignor to the United States of America as represented by the Secretary of War No Drawing. Application January 29, 1947, Serial No. 725,168

5 Claims. (Cl. 167—22)

This present invention relates to the therapeutic art and is based on the discovery that carboxymethoxylamine is an effective bacteriostatic agent that affords efficient protection against bacterial contamination of therapeutic compositions such as blood plasma and albumin compositions and also in the antibiotic field.

This invention will be understood more readily from the following description and the features of novelty will be pointed out in particularity in the appended claims.

In accordance with the present invention, it has been discovered that carboxymethoxyamine hemihydrochloride, also identified as amineoxyacetic acid hemihydrochloride,

$H_2N.O.CH_2.COOH.HCl$ possesses valuable properties as a bacteriostatic and antibiotic material that is effective against organisms of widely diversified varieties while having, at most, a low toxicity to humans in concentration effective as a bacteriostatic and antibiotic material.

In carrying out the investigations upon which the present invention is predicated, the compound carboxymethoxyamine hemihydrochloride was found to be readily soluble in water, 200 mgs. of the compound per 100 c.c. of water forming a solution with a very low pH value. When added to culture media, no precipitate forms, and with reasonable buffering the pH value may be maintained between 6 and 8. Similarly, when added to concentrated protein solutions or culture suspensions, the physical properties of these materials are not altered.

The compound keeps in dry form and in various solutions. It will withstand autoclaving without loss of strength.

Bacteriological investigations were made to evaluate the following variables:

1. Size of inoculum.
2. Strain of organism.
3. Media.
4. Temperature.
5. Duration of exposure to drug.
6. Drug concentration.

For the size of the inoculum, the compound was investigated using *B. coli* and a drug concentration of forty-five milligrams to 100 c. c. It was found that all inocula varying from six organisms to one billion organisms per c. c. were prevented from multiplying. In the event of hardy laboratory contaminants, the same phenomenon is observed, inocula varying from a few per c. c. to thousands per c. c. being prevented from multiplying. From practical experience, it is known that the chance contamination of biologic materials rarely runs above 300 organisms per c. c., so that the compound employed in accordance with the present invention is effective in controlling the numbers of organisms of a usual laboratory contamination.

In carrying out the investigations relating to the control of laboratory contaminations, tests were conducted with *B. coli*, *B. pyocyaneous*, two gram-negative room temperature organisms, staphylococcus aureus and diphtheroids. These last organisms represent the hardiest and most common laboratory contaminants. The room temperature organisms survive at 0° C., even growing to a certain extent, and multiply luxuriantly at room temperature, while the other organisms grow best at 37° C. or slightly higher. In the development of the present invention, a large number of other bacteria have been studied and enough experiments have been carried out to establish that the phenomena applying to the hardier contaminants are true with all bacterial species. Thus, the material of this invention has been investigated in connection with the following organisms, cultivated in media which have been twenty-five percent albumin solution, concentrated globulin solution and tryptic digest broth:

| | |
|---|---|
| Eberthella typhosa | Proteus Ox 2 |
| Sal. paratyphi | N. intracellularis |
| Sal. shottmuelleri | Proteus Ox 19 |
| Sal. cholerasuis | Ps. aeruginosa |
| Shig. paradysenteriae | V. metchnikovi |
| Shig. sonne | C. diphtheriae |
| Proteus Ox K | B. subtilis |
| Streptococcus (alpha) | B. anthracis |
| Streptococcus (beta) | Room temperature or- |
| Pneumoniae type III | ganisms (2 strains) |

In general, the broth has been found to be the best culture media, and somewhat higher concentrations of the compounds are necessary to inhibit growth in broth than are necessary in albumin or globulin solution. The compound of the present invention inhibits equally the spore and the vegetative forms of the above species.

Viruses, yeasts and molds are not affected by the compound of the present invention in concentrations effective against bacteria. Roughly 100-fold the concentration which will inhibit the bacterial strains listed above is necessary to inhibit the growth of inocula of less than 1000 per c. c. of *Monilia albicans*. In small inocula of 1000 organisms per c. c., the action of the compound is roughly proportional to the number of bacteria present.

The minimal inhibiting amount of the compound of the present invention is bacteriostatic. The compound of the invention prevents cell division and causes cell gigantism and pleomorphism. Bacteria held in this state may be subcultured effectively into drug-free media at any time up to death, which may not take place for two weeks or more.

Studies of the action of the compound on large inocula (for instance five million organisms per c. c.) of bacteria held in drug concentrations just below or above the minimal inhibiting level have not demonstrated acquired resistance to the compound when the organisms are transferred to new environments containing below or above the minimal inhibiting drug concentrations. Increased concentrations of the compound may cause immediate death of small inocula less than 200 per c. c.), especially if bacterial metabolism is accelerated by raising the temperature. Conversely, a low temperature may prolong bacterial survival in the presence of inhibiting concentrations of the compound. Increasing the temperature from 6° C. upward causes an increased effectiveness of the compound depending on the bacterial species. Temperatures up to 43° C. usually accelerate bacterial death, but in some species, such as staphylococcus aureus for example, there is slightly greater resistance to the compound at 43° C. Temperatures of 56° C. for 15 minutes will kill both vegetative and spore forms of the bacteria so far studied in the presence of the compound.

"Resting bacteria," i. e., suspensions of live washed bacteria, such as B. coli or typhoid, for example, containing from one thousand to one billion organisms per c. c., die slowly when exposed to solutions of the compound of the present invention containing from 500 mgs. to 1000 mgs. of the compound per 100 c. c., in reverse proportion to the number of organisms present. There appears to be a rough ratio between the amount of compound and the number of bacteria it will inhibit or kill in a given period of time. Thus, organisms of the above-indicated varieties in amounts of sixty million per c. c. are killed after four days in the presence of the compound of the present invention.

In investigating the effect of the present compound on washed bacteria, it was found that at 37° C., washed saline suspensions of B. coli in amounts of one thousand organisms per c. c., will survive for days in solutions of the present compound in concentrations of 10 mgs. to 100 mgs. of the compound per 100 c. c. Similar suspensions in concentrated albumin are killed within the time it takes to plate them out by 100 mgs. of the present compound per 100 c. c. and with hours by 50 mgs. per 100 c. c. and within days by 12 mgs. per 100 c. c. At 23° C. and 6° C., proportionately longer periods of exposure cause bacterial death. Spores of B. subtilis and B. anthrax in broth survive but do not multiply in 5 to 10 mgs. per 100 c. c. of the compound in inverse proportion to the drug concentration. However, at from 50 mgs. to 100 mgs. per 100 c. c. immediate death of the organisms is observed.

The use of the compound of the present invention as a preservative in hypertensive work has been studied. To solutions of plasma freshly prepared so as to contain hypertensinase was added a solution of 10 mgs. of the present compound per 100 c. c. These solutions were incubated in uncorked test tubes in a 37° water bath for from two to six hours and then were injected into cats. Gross contamination after the open air incubations was not observed throughout the experimental procedures, and pyogenic reactions in the animals which received the injections were not seen. It also was noted that the enzyme system being studied was not injured by the compound of the present invention.

Ten mgs. of the present compound per 100 c. c. were added to solutions of veratrone, renin, plasma, beef globulin and human globulin. These solutions were stored at 4° C., and from month to month sampled, and the samples plated out and incubated at 37° for seventy-two hours. Colony counts at different times showed that where gross contamination did not exist at first, the numbers of bacteria did not increase. B. subtilis, E. coli, diptheroids and micrococci were the contaminants encountered. If the solutions were removed from the ice box and placed at 23° C. or 32° C. for five hours, colony counts did not increase but did in the heated solution in the untreated controls.

A further test was made using 25% human albumin, tryptose broth, and plasma with 10, 20 and 100 mgs. per 100 c. c. of the present compound. These solutions were placed in sterile tubes, uncorked, at 37° for twenty-four hours. It was found that the compound in the amount of 20 mgs. per 100 c. c. was bacteriostatic and 100 mgs. per 100 c. c. bactericidal.

The above test was repeated with albumin and broth artificially inoculated with 80 B. subtiles, 150 Staphylcoccus aureus and 460 E. coli per c. c. After five and one-half hours at 37° C. the controls had overgrown, while the solutions treated with 10 mgs. of the present compound per 100 c. c. were bacteriostatic without increase in numbers of organisms, and 100 mgs. of the compound per 100 c. c. was bactericidal. In twenty-four hours 10 mgs. had grown out, and 20 mgs. per 100 c. c. of the present compound was bacteriostatic.

The results indicate that approximately 25 mgs. of the present compound per 100 c. c. is the minimum practical bacteriostatic concentration of the compound, while approximately 100 mgs. per 100 c. c. is bactericidal in hours to days depending on whether the metabolism of the bacteria is promoted by raising the temperature to growth-stimulating degrees and depending on the type of bacteria involved.

It will be understood that the term "culture media" employed in the appended claims includes physiological solutions such as blood plasma, and albumin compositions as well as the usual bacteriological culture media. The carboxymethoxylamine hemihydrochloride occurs as a white crystalline powder which is somewhat hydroscopic but which remains stable in the stoppered containers. It is readily soluble in water, acids, alkalies, concentrated protein solutions, and the usual bacteriological culture media. Unless neutralized with a base or buffered, its solution in water is highly acid. It will withstand autoclaving at 15 pounds steam pressure for twenty minutes without appreciable loss in anti-bacterial power or change in animal toxicity.

The terms "bacteria," "bacterial growths" and similar terms used in the appended claims are intended to include organisms such as molds, fungi and yeasts, as well as such organisms as are referred to commonly as "bacteria."

Having thus described my invention, what I claim as new and wish to obtain by Letters Patent is:

1. As a bacteriostatic agent, an aqueous solution consisting essentially of carboxymethoxylamine hemihydrochloride in a culture medium.

2. As a bacteriostatic and antibiotic agent, an aqueous solution consisting essentially of carboxymethoxylamine hemihydrochloride containing from approximately 25 mgs. of this compound per 100 c. c. of solution, the solution being incorported in a culture medium.

3. The method of inhibiting bacterial growths in culture media which comprises incorporating in the media small but effective amounts of carboxymethoxylamine hemihydrochloride.

4. The method of inhibiting bacterial growths in culture media which comprises incorporating in the culture media an aqueous solution comprising carboxymethoxylamine hemihydrochloride containing at least approximately 25 mgs. of this compound per 100 c. c. of solution, the said solution having a pH value of from approximately pH 6 to approximately pH 8.

5. As a bacteriostatic and antibiotic agent, an aqueous solution consisting essentially of carboxymethoxylamine hemihydrochloride, the said solution having a pH value between approximately pH 6 and pH 8 and incorporated in a culture medium.

HANS T. CLARKE.

REFERENCES CITED

The following references are of record in the file of this patent:

Borek, "Carboxymethoxylamine," J. Am. Chem. Soc., vol. 58 (1936), pages 2020–2021.

Science, June 28, 1940, vol. 91, No. 2374, pages 624–625.